July 6, 1965 D. A. POZSGAY 3,193,170
FLYING HOT SAW

Filed April 27, 1961 2 Sheets-Sheet 1

INVENTOR.
DEZSOE ALBERT POZSGAY
BY Bosworth, Sessions,
Herustrom & Knowles
ATTORNEYS July 6, 1965  D. A. POZSGAY  3,193,170
FLYING HOT SAW
Filed April 27, 1961  2 Sheets-Sheet 2
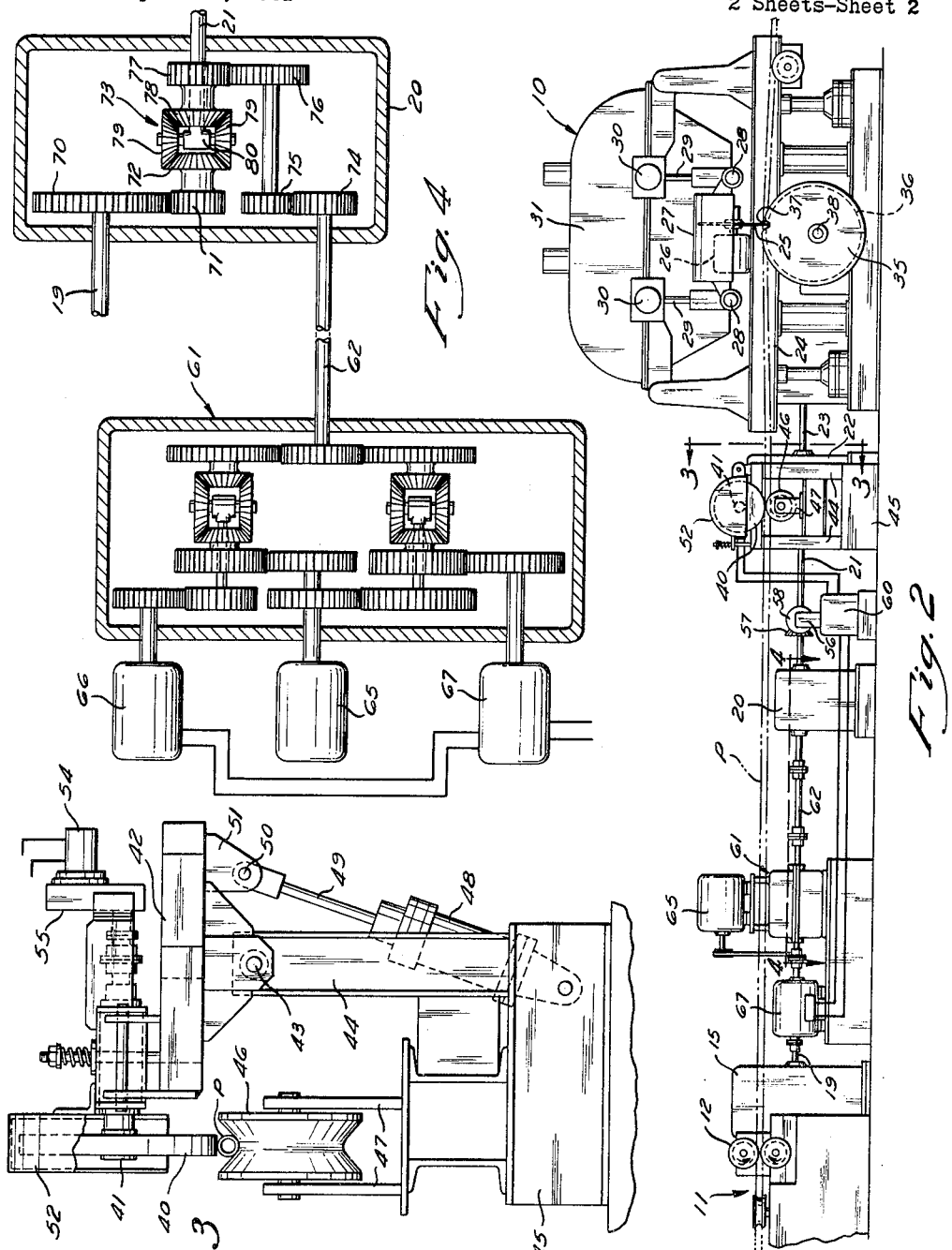
INVENTOR.
DEZSOE ALBERT POZSGAY
BY
Bosworth, Sessions
Herrstrom & Knowles
ATTORNEYS United States Patent Office 3,193,170
Patented July 6, 1965

3,193,170
FLYING HOT SAW
Dezsoe Albert Pozsgay, Ellwood City, Pa., assignor to Blaw-Knox Company, Pittsburgh, Pa., a corporation of Delaware
Filed Apr. 27, 1961, Ser. No. 106,025
4 Claims. (Cl. 228—8)

This invention relates to flying saws and the like for cutting off successive lengths of continuously moving stock, and more particularly to an improved apparatus whereby the accuracy of the lengths cut by the apparatus is greatly improved and scrap losses reduced. The apparatus described herein is designed for sawing welded pipe into lengths, but it is to be understood that the invention may be utilized in connection with flying cut-offs for other continuously moving, elongated materials.

In the manufacture of steel pipe by a well-known process, skelp is heated to welding temperature in a furnace and then passed at high speed through forming and welding rolls in which the skelp is formed into tubular shape and the abutting edges welded together to form the pipe. The skelp is supplied in large coils and in the usual practice the forward end of one coil is welded to the trailing end of the preceding coil before the skelp enters the furnace, thus making it possible to carry on the welding operation for relatively long periods of time without interruption. In any event, the mill continuously produces pipe in pieces that are many times longer than ordinary commercial lengths, and such production is included within the term "continuously" as used herein. Since mills of this type operate at high rates of speed, speeds of several hundred feet per minute being common, it is necessary to provide some sort of flying cut-off mechanism in order to cut the pipe into lengths as it emerges from the mill.

A flying hot saw or cut-off that successfully meets the requirements of mills of this type is disclosed and claimed in the Rodder Patent No. 2,645,001 issued July 14, 1953. Other saws of the same general type are disclosed and claimed in the Rodder Patent No. 2,693,630, issued November 9, 1954, and in the Rodder Patent No. 2,775,808, issued January 1, 1957. In the apparatus disclosed in said patents, a circular saw or like tool is carried by a crank mechanism in a circular path or orbit. Means are provided for guiding a continuously moving workpiece, such as pipe or tube emerging from a mill, in a path adjacent the orbit of the cutting tool and for causing the work and cutting tool periodically to intersect thereby to sever the stock, the direction of action of the cutting tool being perpendicular to the path of the work.

In apparatus of this type, the length in feet of the pieces cut by the saw is equal to the speed of the work passing through the saw in feet per minute divided by the number of cuts per minute. Thus, by controlling the rotational velocity of the saw in its orbit and the frequency with which the saw is caused to intersect the path of the work, i.e. controlling whether a cut is made every one, two, four, or eight revolutions of the saw in its orbit, for example, the saw can be made to cut the pipe into pieces of the desired length.

Heretofore, it has been the practice to control the length of cut by synchronizing the speed of the drive for the saw with the drive for the mill, either by electrical means or by using a common drive motor, a direct mechanical connection between the mill and the saw. The length of cut then may be varied by varying the speed of the saw with respect to the mill by a speed-change device such as a positive infinitely variable drive (P.I.V.). While this mode of operation gives satisfactory results, the accuracy of the length of pipe cut by the saw, particularly at high speeds, is not as great as desired because of factors such as slippage that may occur between the pipe and the mill rolls, wear of the mill rolls, variations in the width of the skelp entering the mill and fluctuations in motor speed. For these and similar reasons, the speed of the last roll stand in the mill is not an entirely accurate measure of the speed of the pipe leaving the mill and entering the saw. Therefore, the scrap losses caused by the necessity for cropping the ends of the pipe to obtain standard lengths have been considerable.

Accordingly, a general object of the present invention is to provide an improved flying cut-off and more particularly an improved speed control for flying cut-offs, whereby the accuracy of the length of cut made by the apparatus is greatly improved. Other objects include the provision of a length control for flying cut-offs that can be manufactured and installed at reasonable cost, that is reliable and efficient in operation, and that can be adapted to existing apparatus without undue expense.

According to the present invention, these and other advantageous results are obtained by directly measuring the speed of the work piece as it emerges from the mill and utilizing this measurement to control and almost instantaneously correct, if need be, the speed of the drive for the cut-off to provide cuts of the desired length.

A preferred form of the invention is illustrated somewhat diagrammatically in the accompanying drawing in which;

FIGURE 2 is a front elevational view of the apparatus shown in FIGURE 1;

FIGURE 3 is a transverse sectional view taken along the line 3—3 of FIGURE 2 and illustrating the wheel for measuring the speed of the pipe as it approaches the saw, and FIGURE 4 diagrammatically illustrates preferred forms of differential drive mechanisms that are employed in the speed control.

Figure 1:
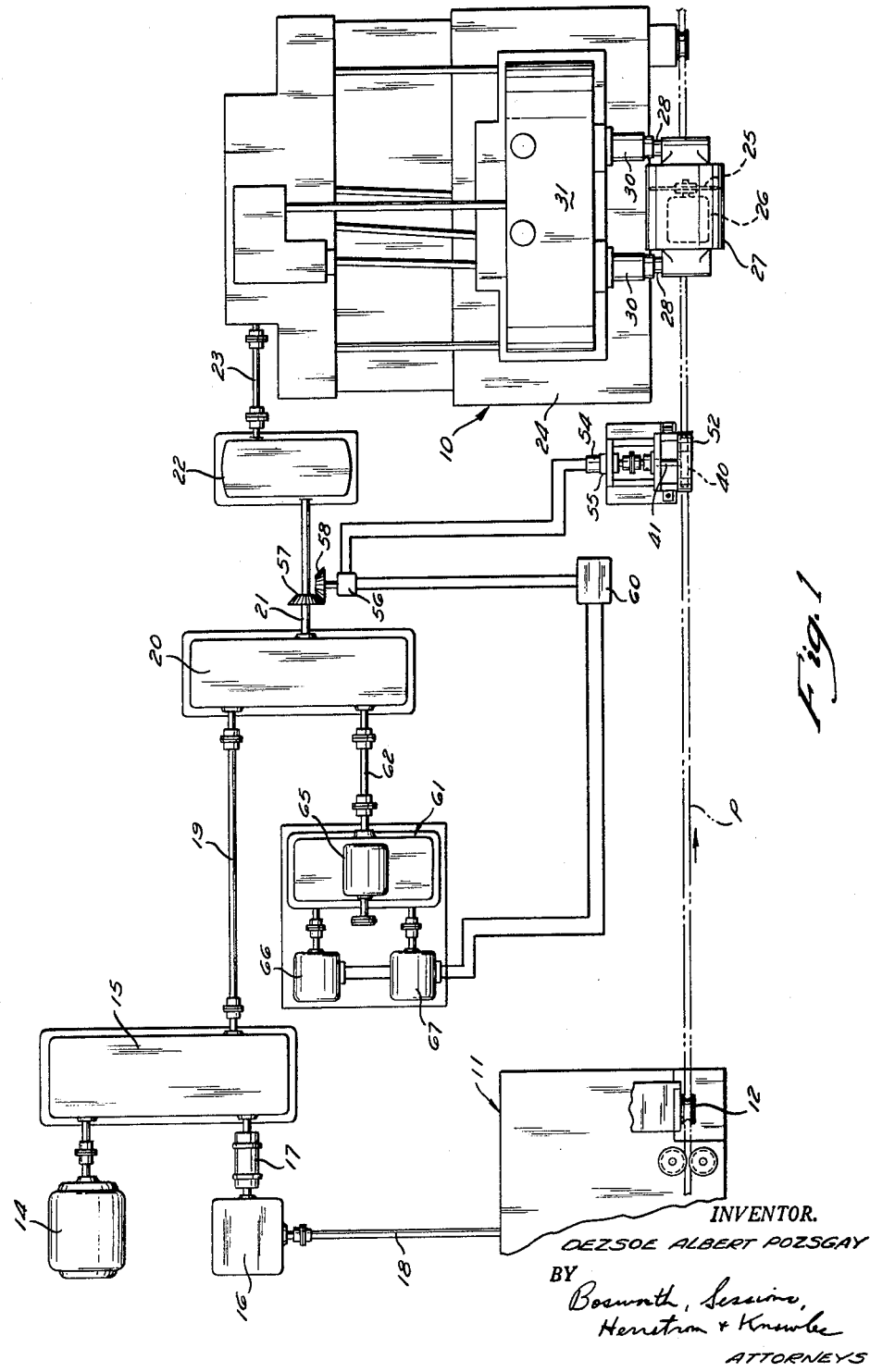
FIGURE 1 is a plan view of an apparatus made according to the present invention.

Referring particularly to FIGURES 1 and 2 of the drawings, the invention is disclosed herein in connection with a flying saw indicated in general at 10 and of the type disclosed and claimed in the above mentioned patents. It is to be understood, however, that the invention is useful in connection with any type of flying saw or cut-off in which the length of cut is determined by the relationship between the speed at which the pipe is delivered from the mill to the saw and the speed of the main drive for the saw.

In the preferred arrangement shown in the drawings, the saw 10 receives pipe P from a welding mill indicated in general at 11 and severs it into pieces of a desired length. The final roll stand of the mill is shown at 12; these rolls deliver the pipe P to the flying saw 10. Suitable supporting rolls may be disposed between the rolls 12 and the saw 10 if desired. The mill is driven by a main drive motor 14 through suitable gearing 15 and 16, coupling 17 and shaft 18. In the illustrated embodiment, the motor 14 is also utilized to drive the saw 10, the drive being through the reduction gearing 15, a main power shaft 19, a differential 20 which was described below functions to drive the saw 10 at very accurately controlled speeds through its output shaft 21, which is also referred to herein as the main drive shaft, a P.I.V. 22 and a saw drive shaft 23.

The flying saw 10 may comprise a suitable frame structure 24 supported upon an appropriate foundation or base. The frame structure 24 carries the cutting tool which, in the present embodiment, is a circular saw blade 25. The saw is driven by a motor 26, the saw preferably being mounted directly on the shaft to the motor and the saw and motor are supported in a carriage structure 27 which in turn is mounted upon crank pins 28 carried by crank arms 29. The crank arms are mounted on crank shafts 30 which are supported by suitable bearings in the upwardly extending box-like portion 31 of the frame structure 24. The crank arms are driven from the saw drive shaft 23 through appropriate suitable power transmission mechanisms as disclosed in the above mentioned patents. Thus, with this arrangement, the saw blade 25 is carried in an orbital path by the crank arms 30, the saw blade always remaining parallel to itself in its orbit and perpendicular to the path of the pipe P.

As noted above, in saws of this type the path of the tube is normally adjacent to, but does not intersect, the path of the saw. In order to make the paths of the saw and tube intersect so that the saw can sever the tube, the work is periodically deflected into the path of the saw by a cam 35 of non-circular shape having a grooved periphery for guiding the tube as indicated at 36. The cam is notched as at 37 at its high point so that the saw can sever the tube without cutting the peripheral portion of the cam.

The cam is rotated in synchronism with the crank arms 29 carrying the saw 25 in such manner that the notched high point of the cam coincides with the position of the saw when it is in its lowest position, as shown in FIGURE 2. The cam 35 is rotated by the saw drive shaft 23 through appropriate power transmission means such as disclosed in the aforesaid patents, and as described in the aforesaid patents the cam shaft 38 is preferably mounted in an eccentric so that the cam can be lifted to enable it to deflect the tube into the path of the saw once in every two, three or more revolutions of the cam depending upon the length of cut to be desired. Mechanisms for carrying out this operation are described in the aforesaid patents and reference is made to them for more complete descriptions.

As mentioned above, in saws of this type the length of the pieces cut by the saw depends upon the speed of the work passing through the saw and the rate at which the cuts are made. The number of cuts per minute made by the saw is governed by the speed of the rotation of the saw in its orbital path and the frequency with which the work is deflected into the path of the saw. Thus, if the saw is rotating in its orbit at, for example, 60 revolutions per minute and if the work is deflected by the cam into the path of the saw every other revolution, then the saw will make 30 cuts per minute. If at the same time the work is advancing through the saw at 900 feet per minute, the length of the pieces cut by the saw will be 900 divided by 30, or precisely 30 feet. The number of cuts per minute made by the saw is determined by the adjustment of the eccentric drive for the cam, which controls the number of revolutions of the saw per cut, and the revolutions per minute of the saw in its orbital path. For a given number of revolutions per cut as determined by the eccentric, then, the number of cuts per minute made by the saw depends upon the speed of rotation of the saw drive shaft 23. The speed of the saw drive shaft 23 in turn is governed by the setting of the P.I.V. 22 and the speed of rotation of the differential output shaft or main drive shaft 21. Therefore, so long as the speed of the main drive shaft 21 is accurately maintained at a fixed relationship to the speed of the pipe P entering the saw 10, then for a given adjustment of the P.I.V. and for a given frequency of cut as determined by the drive for the eccentric, the length of the pieces cut by the saw will remain constant with a high degree of accuracy regardless of variations in the speed of the pipe leaving the mill. In other words, so long as the speed of the main drive shaft 21 bears a fixed relationship to the speed of the pipe P and no adjustments are made in the P.I.V. or the eccentric, then the number of cuts per minute made by the saw will vary directly with the speed of the pipe and the length of the pieces cut will remain constant.

According to a preferred form of the present invention this result is accomplished by accurately measuring the speed of the pipe between the last roll stand 12 of the mill 11 and the saw 10, accurately measuring the speed of rotation of the main drive shaft 21, comparing these speeds and utilizing signals derived from the comparison of the speeds to control the speed of the shaft 21 to maintain the desired constant relationship between the speed of the pipe P and the speed of the shaft 21.

In order accurately to measure the speed of the pipe P a speed measuring wheel 40 is disposed between the mill and the saw and preferably close to the saw. As shown particularly in FIGURE 3, the wheel 40 engages the top surface of the pipe P. The wheel is supported on a suitable shaft 41 that is mounted in appropriate bearings carried by a bracket 42 pivotally mounted as at 43 on an upright frame member 44 that is supported on a build-up base 45. The pipe P is supported in engagement with the measuring wheel 40 by a guide roller 46 that is preferably grooved as shown and is supported by an appropriate shaft and bearings carried by uprights 47 that are also mounted on the base 45.

In order to insure proper contact between the periphery of the wheel 40 and the pipe P, an air cylinder 48 is pivotally connected to the base 45 and has its piston rod 49 pivotally connected as at 50 to a bracket 51 secured to bracket 42. Air under pressure in cylinder 48 urges the piston rod 49 upwardly and urges the wheel 40 downwardly into engagement with the pipe P. The pressure in the cylinder 48 is adjusted so that the wheel 40 engages the pipe with sufficient force substantially to prevent slippage between the pipe and the wheel. The upper part of wheel 40 is preferably enclosed in a cover or shield 52.

In order to produce a signal representative of the speed of the pipe, the shaft 41 drives a synchro generator 54 through gearing disposed within a gear housing 55. The synchro, as is well known, produces an electrical signal which depends upon the angular position of the rotor of the synchro with respect to its stator. This signal is compared with a feedback signal that is representative of the angular position of the main drive shaft 21 in a synchro control transformer 56 that is driven by shaft 21 through gears 57 and 58. The diameter of the speed measuring wheel 40 and the ratios of the gearing 55 and 57–58 are chosen so that when the main drive shaft 23 is driven at a speed bearing the desired relationship to the speed of the pipe P, the synchros 54 and 56 rotate at precisely the same speed. The output of the synchro control transformer 56 is then representative of the relative speeds and angular positions of the shaft 21 and wheel 40. If the synchros are rotating at the same speed and if the rotors of the synchros are disposed at the same angles with respect to their stators, then the synchro control transformer 56 has no output. If, however, one synchro leads the other, then the synchro control transformer produces an output signal that is proportional to the angle between the rotors of the two synchros and the polarity of which depends upon whether the synchro generator is leading or lagging the synchro control transformer. Thus, as is well known to those skilled in the art, the synchros can be used accurately to compare the speed of one shaft with another. In the present case, then, the output of the synchro control transformer 56 depends upon the relative speeds of the synchros 54 and 56 and the relative angles between the rotors of the synchros and their respective stators. Therefore, the output of the synchro control transformer 56 can be utilized to control the speed of the shaft 23 to maintain the desired relationship between the speed of the shaft and the speed of the pipe P.

According to a preferred form of the present invention, the desired controls are accomplished by amplifying the output of the synchro control transformer 56 in a magnetic amplifier or other suitable amplifier 60 and utilizing the amplified output of the synhro control transformer to control an electric differential drive 61. The output of the electric differential drive is through shaft 62, which constitutes an auxiliary input shaft of the differential 20.

The output of the electric differential drive 61 is added to or subtracted from the speed of the main power shaft 19 in the differential 20 in order to maintain the speed of the shaft 21 at the desired value.

Electric differential drives are commercially available products which have very accurately controlled output speeds throughout the ranges of the machines. A suitable electric differential drive is marketed under the name "Specon" by Stratos Division of Fairchild Engine and Airplane Corporation. These drives comprise a standard A.C. motor 65 (see FIGURES 1 and 4) that operate at a substantially constant speed. A.C. motor 65 supplies power to the differential diagrammatically illustrated in FIGURE 3, and output speed variation is accomplished by controlling the field excitation of the two D.C. machines 66 and 67, the field excitation being supplied by amplifier 60. The D.C. machines are inter-connected electrically and as shown in the drawing are inter-connected mechanically through gearing. Since this is a known commercially available drive it will not be described further herein except to say that with a drive of this type the output speed of the shaft 62 is controlled accurately in response to signals derived from the synchro control transformer 56.

In the preferred form of the present invention, the electrical differential drive 61 is designed to operate at speeds of from 0 to approximately 300 r.p.m. and the output of the drive 61 is added to the speed of the shaft 19 in differential 20 so that the main drive shaft 21 is driven at the desired speed. This is accomplished in the differential 20 in which gear 70 driven by the main power shaft 19 drives a pinion 71 that is connected directly to bevel pinion 72 of a differential 73. The auxiliary input shaft 62 drives a gear 74 which, through gears 75, 76 and 77 drives the pinion 78 of differential 73. The planet gears 79 of differential 73 are supported on a carrier 80 which is connected to shaft 21 of the differential. With this arrangement, if the shaft 62 is stationary, then the speed of the output shaft 21, which is the main drive shaft for the saw is directly proportional to the speed of the main power shaft 18. If the auxiliary input shaft 62 is driven, the speed of shaft 21 is varied with respect to the speed of main power shaft 19 and becomes functional not only of the speed of shaft 19 but also of the speed of shaft 62.

In the preferred form of the apparatus shown, the gear ratios are such that when the auxiliary input shaft 62, which is the output of the electric differential drive 61, is stationary the main drive shaft 21 is driven a little slower than the speed that is required to keep the saw in step with the pipe. Normally the electric differential drive 61 operates so that its output is somewhere near the middle of its speed range and its output shaft 62 adds precisely the number of revolutions per minute in the differential 20 to make shaft 21 rotate at a speed such that synchro 56 and synchro 54 are driven almost exactly in synchronism at all times. Since the shaft 19 drives the differential at approximately the correct speed, it supplies the major portion of the power to the differential for driving the saw, only a minor part being supplied by the electric differential drive 61 through shaft 62. Furthermore, since the shaft 19 is driven in synchronism with the drive of the mill, it is approximately in synchronism with the speed of the pipe.

With this arrangement, the changes in speed of shaft 19 that takes place simultaneously with changes in the speed of the mill make the major corrections required in the speed of the saw to maintain the cuts at the desired length. Thus, coarse adjustments are made by the main power shaft 19 and the duty imposed upon the electronic differential drive is reduced to that of making fine adjustments for the precise control of the speed of the shaft 21. If at any time the shaft 21 should be driven at a speed different from the correct speed, the change will be sensed immediately by the synchros; the change in angle between the rotors of the synchros will cause an immediate change in the output of the synchro control transformer 56 and the amplifier 60, which in turn will control the excitation of the D.C. machines 66 and 67 and the output of the electric differential drive 61 very promptly to bring the speed of the shaft 21 into synchronism with the speed of the pipe. Ordinarily, the required correction will be made by the time the angular positions of the rotors of the synchros with respect to each other has changed a few degrees.

It may be considered that the synchro 54 driven by the wheel 40 provides a reference signal to the synchro control transformer 56 while the mechanical connection between the shaft 21 and synchro control transformer provides feed-back signal. The output of the synchro control transformer constitutes an error signal which when amplified controls the electric speed differential to cause it to drive shaft 62 at such a speed that shaft 21 is driven at the correct speed. In the present example, if the shaft 21 speeds up with respect to the pipe, the differential output shaft 62 is slowed down; conversely, if the shaft 18 slows down with respect to the pipe, the speed of the shaft 62 is increased to compensate. Thus, the system described causes the shaft 21 to be driven at a speed very precisely related to the speed of the pipe. Since the speed of the shaft 21 constitutes the basic reference for the drive of the saw, the length of cut can be accurately controlled. Once set by means of P.I.V. 22 and proper adjustment of eccentric that carries the cam 35 the length of cut is maintained with a high degree of accuracy regardless of variations and the speed of operation of the mill and regardless of changes in speed of the pipe with respect to the speed of the mill such as are occasioned by differences in slippage, variations in the size of the skelp, wear of the mill rolls and other similar factors. Thus, the apparatus functions to operate the saw with a high degree of accuracy with the result that even at speeds of the order of 1,000 feet per minute, the saw is able to cut lengths within a tolerance of plus or minus ⅛ inch in a 42 foot length of pipe, resulting in an important reduction in scrap losses.

While in the preferred arrangement shown the saw is driven primarily by the main drive motor 14 for the mill it will be evident that, if desired, the shaft 19 could be driven by a separate motor electrically synchronized with the mill motor, in which case the mode of operation of the apparatus would be essentially the same as described herein.

Those skilled in the art will appreciate that various changes and modifications can be made in the invention without departing from the spirit and scope thereof. The essential characteristics of the invention are defined in the appended claims.

I claim:

1. In combination with a butt weld pipe mill for continuously producing welded pipe, a motor for driving the mill, a flying hot saw for severing the pipe into lengths as it leaves the mill, the saw comprising a rotory cutting tool, a pair of cranks for carrying the cutting tool in a circular orbit and means for guiding the pipe emerging from the mill into the path of the cutting tool in its orbit thereby to sever the pipe, the length of the pieces cut by the saw varying with the ratio between the speed of the pipe entering the saw and the number of revolutions per minute of the cutting tool in its orbit, means for driving the cutting tool in its orbit comprising a main drive shaft, a P.I.V. driven by the main drive shaft and a power train between the P.I.V. and the crank arms whereby for a given adjustment of the P.I.V., the number of revolutions per minute of the cutting tool in its orbit is determined by the speed of said main drive shaft; the improvement comprising means for driving said main drive shaft and for maintaining the ratio between the speed of the main drive shaft and the speed of the pipe entering the saw substantially constant comprising a differential having a main power input and an auxiliary input and an output connected to said main drive shaft, a mechanical connection between said motor and said main power input for driving said main power input at a speed substantially proportional to the speed at which said mill is driven and control means for driving said auxiliary input at a speed such that the output of said differential is maintained accurately at a predetermined ratio with respect to the speed of the pipe entering said saw, said control means comprising a roll engaging and driven by the pipe entering said saw, a synchro-generator driven by said roll, the output of the synchro-generator being connected to a synchro-control transformer driven by said main drive shaft whereby the output of said synchro-control transformer provides an error signal proportional to differences in speed between said main drive shaft and said pipe entering said saw, means for amplifying said error signal and an electric differential drive controlled by said error signal and connected to drive said auxiliary input to said differential.

2. In combination with a butt weld pipe mill for continuously producing welded pipe, a motor for driving the mill, a flying hot saw for severing the pipe into lengths as it leaves the mill, the saw comprising a rotary cutting tool, a pair of cranks for carrying the cutting tool in a circular orbit and means for guiding the pipe emerging from the mill into the path of the cutting tool in its orbit thereby to sever the pipe, the length of the pieces cut by the saw varying with the ratio between the speed of the pipe entering the saw and the number of revolutions per minute of the cutting tool in its orbit, means for driving the cutting tool in its orbit comprising a main drive shaft, a P.I.V. driven by the main drive shaft and a power train between the P.I.V. and the crank arms whereby for a given adjustment of the P.I.V., the number of revolutions per minute of the cutting tool in its orbit is determined by the speed of said main drive shaft; the improvement comprising means for driving said main drive shaft and for maintaining the ratio between the speed of the main drive shaft and the speed of the pipe entering the saw substantially constant comprising a differential having a main power input and an auxiliary input and an output connected to said main drive shaft, the output of said differential having a speed proportional to the algebraic sum of the speed of said main power input and the speed of said auxiliary input, means synchronized with said motor for driving said main power input at a speed substantially proportional to the speed at which said mill is driven and control means for driving said auxiliary input at a speed such that the output of said differential is maintained accurately at a predetermined ratio with respect to the speed of the pipe entering said saw, said control means comprising a roll engaging and driven by the pipe entering said saw, means driven by said roll for producing a signal representative of the speed of the pipe entering the saw, means for producing a feedback signal representative of the speed of said main drive shaft for said saw and means responsive to said signals for driving said auxiliary input at the required speed.

3. Apparatus according to claim 2 wherein a synchro-generator is employed for producing the signal representative of the speed of the pipe entering the saw, and the speed control means is controlled in accordance with signals derived from a synchro-control transformer electrically connected to said synchro-generator and driven by said main drive shaft.

4. In combination with a butt weld pipe mill for continuously producing welded pipe, a motor for driving the mill, a flying hot saw for severing the pipe into lengths as it leaves the mill, the saw comprising a rotary cutting tool, a pair of cranks for carrying the cutting tool in a circular orbit and means for guiding the pipe emerging from the mill into the path of the cutting tool in its orbit thereby to sever the pipe, the length of the pieces cut by the saw varying with the ratio between the speed of the pipe entering the saw and the number of revolutions per minute of the cutting tool in its orbit, means for driving the cutting tool in its orbit comprising a main drive shaft, and a power train between the main drive shaft and crank arms whereby the number of revolutions per minute of the cutting tool in its orbit is determined by the speed of said main drive shaft; the improvement comprising means for driving said main drive shaft and for maintaining the ratio between the speed of the main drive shaft and the speed of the pipe entering the saw substantially constant comprising a differential having a main power input and an auxiliary input and an output connected to said main drive shaft, means synchronized with said motor for driving said main power input at a speed substantially proportional to the speed at which said mill is driven and control means for driving said auxiliary input at a speed such that the output of said differential is maintained accurately at a predetermined ratio with respect to the speed of the pipe entering said saw, said control means comprising a roll engaging and driven by the pipe entering said saw, a synchro-generator driven by said roll, the output of the synchro-generator being connected to a synchro-control transformer driven by said main drive shaft whereby the output of said synchro-control transformer provides an error signal proportional to differences in speed between said main drive shaft and said pipe entering said saw, means for amplifying said error signal and an electric differential drive controlled by said error signal and connected to drive said auxiliary input to said differential.

References Cited by the Examiner

UNITED STATES PATENTS

| | | | |
|---|---|---|---|
| 1,947,399 | 2/34 | Umansky | 83—287 |
| 2,618,047 | 11/52 | Mansell | 83—76 |
| 2,645,001 | 7/53 | Rodder | 83—305 X |
| 2,822,047 | 2/58 | Orr et al. | 83—311 |
| 3,071,999 | 1/63 | Thorn | 83—76 |
| 3,084,579 | 4/63 | Melville | 83—299 |

ANDREW R. JUHASZ, *Primary Examiner.*

EDWARD C. ALLEN, WILLIAM W. DYER, JR.,
*Examiners.*